United States Patent [19]
Klein et al.

[11] Patent Number: 5,112,032
[45] Date of Patent: May 12, 1992

[54] HYDRAULIC MOUNT WITH TRIPLE DECOUPLERS

[75] Inventors: Robert R. Klein, Dayton; John F. Hoying, Centerville, both of Ohio

[73] Assignee: General Motors Corporation, Detroit, Mich.

[21] Appl. No.: 638,925

[22] Filed: Jan. 9, 1991

[51] Int. Cl.$^5$ .............................................. F16F 13/00
[52] U.S. Cl. .................. 267/140.1 A; 180/312; 248/562; 248/636; 267/219
[58] Field of Search .................. 262/140.1 R, 140.1 A, 262/219; 180/300, 312, 902; 248/562, 636

[56] References Cited

U.S. PATENT DOCUMENTS 4,708,329 11/1987 Tabata et al. ..................... 267/140.1
4,971,300 11/1990 Ticks ..................... 267/140.1

FOREIGN PATENT DOCUMENTS 26336 1/1990 Japan ..................... 267/140.1

*Primary Examiner*—George E. A. Halvosa
*Attorney, Agent, or Firm*—Ronald L. Phillips

[57] ABSTRACT

A hydraulic mount assembly includes an elastomeric hollow body connected to a pair of opposed mounting members. A resilient diaphragm closes the hollow body and forms therewith a closed cavity that is filled with a damping liquid. A partition plate is provided in the hollow body to divide the cavity into a primary chamber and a secondary chamber. The secondary chamber is enclosed by the diaphragm. An orifice track is provided in the partition plate. The orifice track provides communication between the primary and secondary chambers so as to effect damping. Three decouplers are provided in the partition plate centered relative to distinctive dome areas in the primary chamber; two recessed domes and a center projecting dome. The decouplers respond independently to localized dynamic pressure variations. Together, the orifice track and decouplers serve to restrict and control liquid flow between the chambers so as to passively provide a tunable distinctive dip in dynamic rate to adjust the stiffness at selected high frequencies. A relatively low dynamic rate for small displacements is provided at relatively high frequencies while maintaining damping for large displacements.

2 Claims, 2 Drawing Sheets

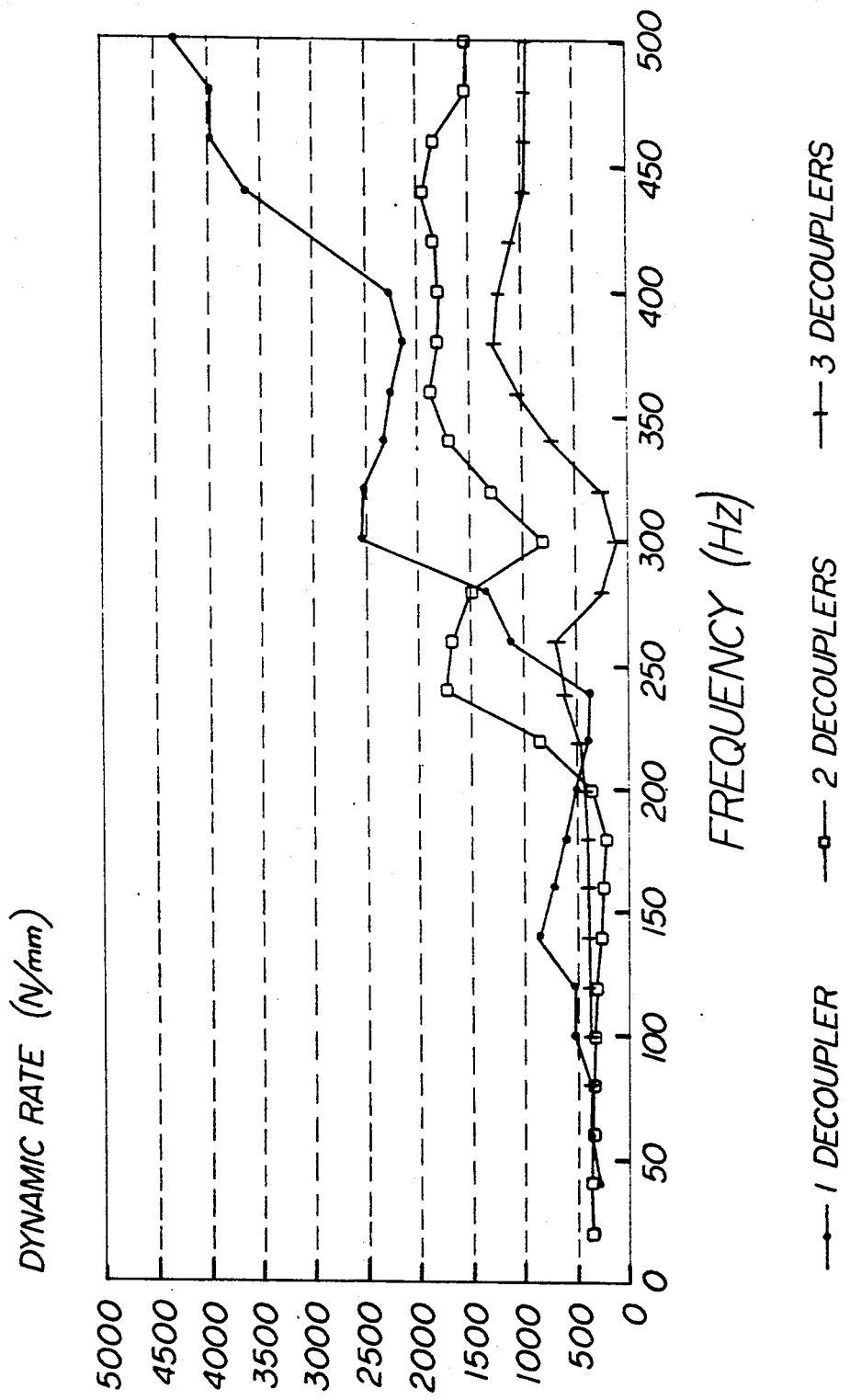

HYDRAULIC MOUNT WITH TRIPLE DECOUPLERS

TECHNICAL FIELD

The present invention relates generally to an engine mount assembly, and more particularly to a hydraulic mount assembly with multiple decouplers providing improved isolation of small amplitude vibrations at relatively high frequencies while maintaining damping for large displacements to limit and control component movement.

BACKGROUND OF THE INVENTION

Several different types of mount assemblies are presently available to isolate vehicle vibrations, such as produced during operation of automobile and truck engines and transmissions. A type of mount commonly used today is the solid rubber block integrally molded to opposed metal bolts. To support a vehicle engine, for example, a number of solid rubber mounts are attached by the bolts between the engine and the vehicle frame. Under these circumstances, the mounts are required to support the engine in the manner of a spring, and dampen vibrations in the manner of a shock absorber element as well. These dual functions often require conflicting operating characteristics, and thus a trade-off of different design considerations. As a result, the mount as designed, generally reflects a compromise, and therefore provides neither optimum load bearing nor damping properties. Thus, although this type of mount is somewhat effective, there is a need for improvement in balancing the conflicting requirements of load support versus damping control.

Recent developments in hydraulic mount technology have led to successful hydraulic elastomeric mounts particularly adapted for engine mounting. An example of such a mount is disclosed in U.S. Pat. No. 4,588,173 to Gold et al, issued May 13, 1986 and entitled "Hydraulic-Elastomeric Mount".

The hydraulic mount assembly of this prior invention includes a reinforced, hollow rubber body that serves as both the load supporting spring and the damping means. A hydraulic cavity, partially formed by the body, is closed by a resilient diaphragm. This cavity is partitioned by a plate into two chambers that are in fluid communication through a relatively large central opening in the plate. The first or primary chamber is formed between the orifice plate and the body. The secondary chamber is formed between the plate and the diaphragm.

A decoupler is positioned in the central opening of the plate and reciprocates and responds to vibrations. The decoupler movement alone accommodates small volume changes in the two chambers. When, for example, the decoupler moves in a direction toward the diaphragm, the volume of the primary chamber increases and the volume of the secondary chamber correspondingly decreases. In this way, for certain small vibratory amplitudes and generally higher frequencies, fluid flow between the chambers is substantially avoided and undesirable hydraulic damping is eliminated. In effect, this freely floating decoupler is a passive tuning device.

In addition to the relatively large central opening, an orifice track with a smaller flow passage is provided extending around the perimeter of the orifice plate. Each end of the track has an opening; one opening communicating with the primary chamber and the other with the secondary chamber. The orifice track therefore provides the hydraulic mount assembly with another passive tuning component, and when combined with the freely floating decoupler provides at least three distinct dynamic operating modes. The particular operating mode is primarily determined by the flow of the fluid between the two chambers.

More specifically, small amplitude vibrating input such as from smooth engine idling or the like, produces no damping due to the action of the decoupler as explained above. Large amplitude vibrating inputs produce high velocity fluid flow through the orifice track, and accordingly a high level of damping force, and desirable smoothing action is obtained. A third or intermediate operational mode of the mount occurs during medium amplitude inputs resulting in lower velocity fluid flow through the orifice track. In each case of switching from one mode to another, a limited amount of fluid can bypass the orifice track by moving around the edges of the decoupler, smoothing the transition between operational modes.

This basic mount design has proved quite successful, and represents a significant advance over the prior art engine mounts, particularly the solid rubber type. More particularly, hydraulic mounts provide a more favorable balance of load supporting and damping control. It should be appreciated, however, that additional improvement in operating characteristics is still possible.

More specifically, many hydraulic mounts having a single decoupler suffer a significant, dynamic rate increase at higher frequencies. As a result, the mounts do not provide the desired vibration and noise isolation for certain small displacements at these higher frequencies. Consequently engine vibration, such as during idling operation, may be transferred to the driver, especially through the steering wheel or other vehicle operating controls, such as the gear selector.

In the past, efforts have been made to address this problem. As a result of those efforts, a number of "active" mounts have been developed wherein vehicle operating conditions are sensed and the performance characteristics of the mount are tuned to provide the desired damping or decoupling at any given time. Examples of such active systems are found in U.S. Pat. No. 4,756,513 entitled "Variable Hydraulic-Elastomeric Mount Assembly" and U.S. Pat. No. 4,789,142 entitled "Electronic Motor Mount With Magnetic Decoupler", both owned by the assignee of the present invention.

While these active systems effectively address the problem, it should be appreciated that they have a relatively complicated structure and incorporate relatively expensive components, such as transducers and a microprocessor controller. To reduce costs and increase reliability, it would be desirable to provide a fully passive system that successfully addresses the problem. A step in that direction is made in the mount assembly disclosed in copending United States application of Gunderson entitled "Hydraulic Mount with Dual Decouplers", Ser. No. 07/600,899 filed 22 OCT. 90, and assigned to the present assignee. However, further engineering refinement toward the ideal passive engine mount exhibiting still further improved load support and damping control is needed. The optimum mount would substantially eliminate the compromises between these two functions and maximize overall operating performance in each.

SUMMARY OF THE INVENTION

Accordingly, it is a primary object of the present invention to provide hydraulic mount assembly with additional improvements over the above-described prior art advances, and thereby approaching the ideal balance of hydraulic mount characteristics.

An additional object of the present invention is to provide a hydraulic mount assembly of relatively simple construction exhibiting optimal operating characteristics in a passive system. These desirable characteristics may be obtained by designing the mount to include at least three decouplers.

Another object of the present invention is to provide a hydraulic mount assembly providing both high damping for large engine and/or transmission displacements and a soft dynamic rate for small displacements at substantially all frequencies under the full range of vehicle operating and road conditions.

Still another object of the present invention is to provide a passive hydraulic mount assembly furnishing the required high damping rate to control the motion of the engine and transmission and the required low dynamic rate at frequencies up to 500 Hertz to effectively and efficiently isolate the driver and passengers from small displacement engine and transmission vibrations.

In fact, the present mount assembly provides a characteristic dip in dynamic rate that may be passively tuned through the design of the mount to provide reduced stiffness, and therefore superior vibration isolation and noise suppression properties over a selected range of frequencies. The selected range of frequencies is advantageously selected to correspond to the frequencies at which engine and/or transmission vibrations are most commonly experienced during operation of the vehicle. Accordingly, overall ride performance as well as operator satisfaction are significantly enhanced.

According to the present invention, these objectives can be ideally accomplished by providing three decouplers between the chambers of the mount assembly at longitudinally spaced locations. These decouplers are operatively independent of one another. The decouplers provide for out of phase operation so that localized pressure variations along the length of the mount may be reduced. This serves to effectively reduce the dynamic stiffness of the mount, especially across the critical range of vibrations, that is at generally high frequencies and low amplitude displacements. Consequently, the transmission of noise and vibration is reduced over the full operating ranges, but especially over the selected range, for a smoother, quieter ride.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a hydraulic mount assembly passively provides variable damping characteristics for isolating engine and transmission vibrations. The preferred embodiment of the mount assembly selected to illustrate the invention employs a pair of mounting members. One member is attached to the vehicle frame and the other member is attached to the component, such as an engine or transmission, for which noise and vibration isolation is desired.

In particular, the mounting members are connected to each other through a hollow elastomeric body of natural or synthetic rubber. This hollow body is closed by a resilient diaphragm so as to form a cavity for damping liquid, which may be a commercial engine antifreeze coolant. A partition or plate is provided to divide the fluid filled cavity into two distinct chambers. The primary chamber is formed between the partition and the interior wall of the hollow body. The secondary chamber is formed between the partition and the interior wall of the diaphragm.

The partition further includes an orifice track providing fluid communication between the two chambers so as to effect damping. In order to provide spaced decoupling action and the attendant advantages noted above, three decouplers are provided on the partition between the primary and secondary chambers. Each decoupler has a first seated position toward the primary chamber and a second seated position toward the secondary chamber.

Upon large amplitude contraction (compression), the decouplers are independently actuated with some damping liquid bypassing the orifice track and initially flowing around the decouplers from the primary to the secondary chamber. Once the decouplers are in a seated position in the direction of fluid flow, fluid communication is limited to that through the orifice track at the designed rate of flow. This liquid entering the secondary chamber causes stretching of the diaphragm, increasing the volume of the secondary chamber. Then upon reversal of the force, resulting in expansion of the primary chamber, the stretched diaphragm contracts forcing liquid back to the primary chamber and completing the damping cycle.

In accordance with a further aspect of the present invention, the hollow body defines a dome area in the form of a recess positioned beneath each mounting stud adapted for the mounting of a component (e.g. engine) to be isolated. A projecting dome area is provided directly in the middle of the hollow body. Each of the dome areas serves as a pumping surface for damping fluid.

Additionally, the three decouplers are provided in the partition so to be substantially longitudinally aligned and with one decoupler being substantially centered relative to a corresponding dome area. With the decouplers thus advantageously positioned in parallel beneath the pumping surfaces of the dome areas, it is possible to quickly relieve dynamic pressure variations in the column of fluid in alignment between each cooperating dome area and decoupler. This function occurs as a result of the movement of the respective decoupler to its seated position upon each displacement of the mount assembly.

More particularly, the decouplers are mounted for independent movement and may operate out of phase with each other. The differential nature of the pumping surfaces of the dome areas (two recessed and one projecting), assists in phasing the decoupler action. Also, the decouplers are not only effective in primarily reacting to localized pressure variations, but in preventing differential pressure build up along the length of the entire mount assembly. As a result, skewing action due to the differential pressure tending to tilt the assembly is also more quickly relieved. Further, this reduction in pressure buildup along the full length of the primary chamber of the mount is what prevents formation of a hydraulic barrier or wall, and thus reduces the dynamic stiffness of the mount. Advantageously, the resulting lower rate for small displacements even at higher frequencies significantly reduces the transmission of noise and vibration common with the prior art passive mount designs, including one or even two decouplers. Additionally, the advantageous operating characteristics of the present mount are provided without resorting to more complicated and expensive active systems, such as have been previously presented in the art to date to address this problem.

As a further aspect of the invention, the operating characteristics of the mount assembly may be effectively tuned to provide reduced stiffness at selected relatively high frequencies, for example, between 180 and 500 Hertz. In the preferred embodiment illustrated, the mount assembly is tuned to provide this function across the range of approximately 260-375 Hertz. In this way it is possible to achieve good vibration isolation characteristics matched to the component to be isolated. By varying the surface area of the individual decouplers, and thus the ratio with respect to each other, as well as the overall decoupler surface area of the mount assembly, resonances at certain troublesome frequencies may be more efficiently canceled.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 3 is a graph comparing the dynamic rate of an exemplary mount assembly of the present invention to single and dual decoupler mount assemblies for a relatively low amplitude vibration of ±0.05 mm over a range of frequencies.

Figure 1:
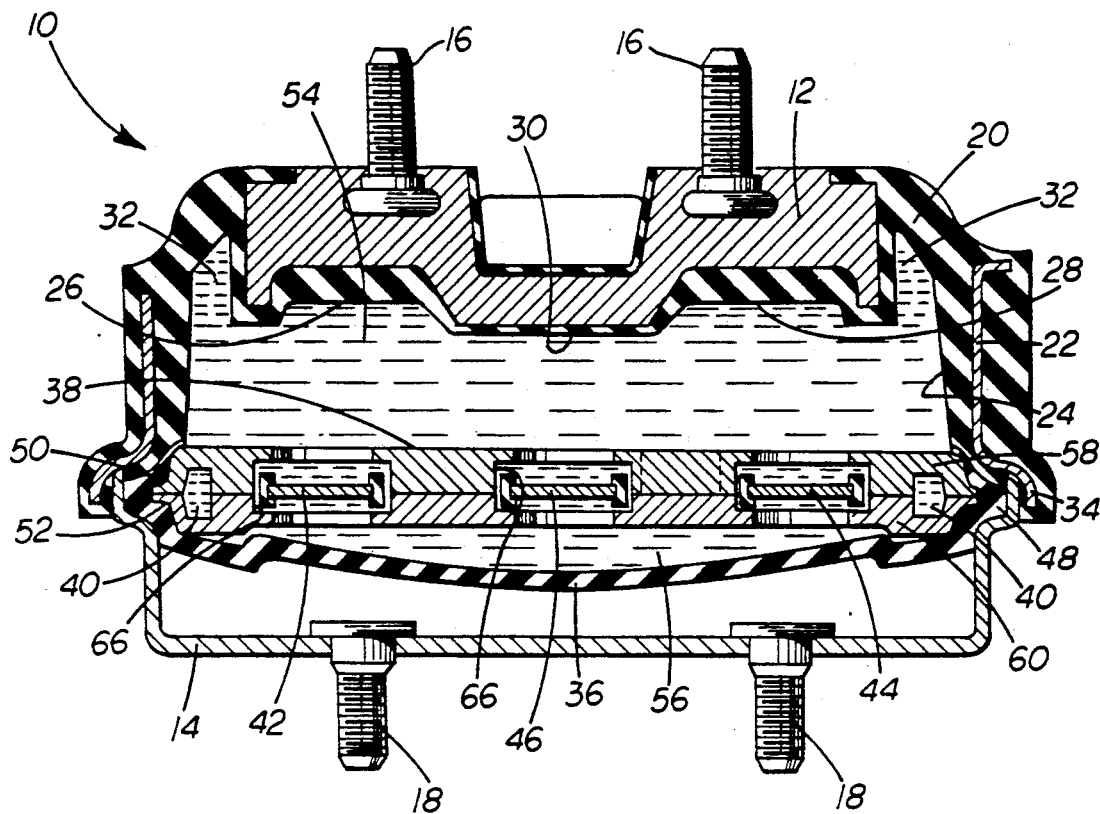
FIG. 1 is a cross sectional view of the hydraulic mount assembly of the present invention showing multiple decouplers.

Reference will now be made in detail to the present preferred embodiment of the invention, an example of which is illustrated in the accompanying drawing.

DETAILED DESCRIPTION OF THE INVENTION

Reference is now made to the drawing showing the improved hydraulic-elastomeric mount assembly 10 of the present invention particularly adapted for mounting an internal combustion engine (or transmission) in a vehicle. The mount assembly 10 relies on passive operation to provide the desired amplitude control, as well as establishing the ideal coefficient of damping, and resulting dynamic rate best suited to isolate engine noise and vibrations. The mount assembly 10 provides the desired decoupling for low amplitude vibrations, by employing the multiple, spaced decoupling action. At the same time, high damping action is provided for large displacements to effectively control more severe engine motion, as may be required during some operating conditions.

The mount assembly 10 includes a cast aluminum mounting member 12 and stamped sheet metal mounting member 14. The mounting members 12 and 14 each have a pair of studs 16, 18, respectively. These studs 16, 18 project outwardly from the mounting members 12, 14 for attachment respectively to an engine (not shown) and an engine supporting cradle or frame of a vehicle (not shown).

A hollow elastomeric body 20 interconnects the mounting members 12, 14. The body 20 is constructed of natural or synthetic rubber. More specifically, the body 20 may be molded to and about the mounting member 12 and to both the interior and exterior of an oval shaped stamped sheet metal retainer 22.

The body 20 is configured to form a hollow cavity 24 for receiving a damping liquid, such as a commercial engine antifreeze coolant. Also defined by and formed in the interior wall of the body are recesses defining dome areas 26, 28. One dome area 26, 28 is provided generally adjacent each mounting point, in this case the studs 16. An additional dome area 30 is provided in the form of the generally flat surface projecting between the recesses of dome areas 26,28. Each dome area 26, 28, 30 serves as a pumping surface for hydraulic fluid between the two chambers of the mount assembly 10 as described in detail below. Voids 32 are also provided in the body 20. These voids 32 assist in providing directional dynamic rate control within the elastomeric body 20 and are part of the damping liquid cavity 24. As is known in the art, such voids 32 are especially useful in isolating certain internal combustion engine vibrations.

Together, the mounting member 12, elastomeric body 20 and metal retainer 22 form a first subassembly or cover of the mount assembly 10. The retainer 22 includes an outwardly projecting collar 34 at its lower periphery. The collar 34 is formed to receive a second subassembly or base. This second subassembly comprises the mounting member 14 and elastomeric diaphragm 36 of natural or synthetic rubber, and a partition 38 with a pair of orifice tracks 40 for providing damping liquid flow. As will be described more in detail below, three decouplers 42, 44, 46 are received for operation in parallel within the partition and generally aligned with the dome areas 26, 28, 30.

The elastomeric diaphragm 36 includes an annular rim section 48 having a radially inwardly facing internal groove formed between upper and lower shoulders 50, 52, respectively. The shoulders 50, 52 are flexible so as to receive the periphery of the partition 38. Thus, the periphery of the partition 38 is sealingly engaged by the shoulders 50, 52 on opposite sides of the groove.

The lower mounting member is formed with a collar to receive the rim 48 of the diaphragm 36. The collar of the mounting member 14 fits within the collar 34 of the retainer 22. As is known in the art, tabs (not shown) may be provided on the collar 34 and bent over to retain the whole mount assembly together.

The elastomeric diaphragm 36 closes the elastomeric body 20 so as to form therewith the closed damping cavity 24. This cavity 24 is divided by the partition 38 into a primary chamber 54 enclosed by the elastomeric body 20 and a secondary chamber 56 enclosed by the diaphragm 36.

Figure 2:
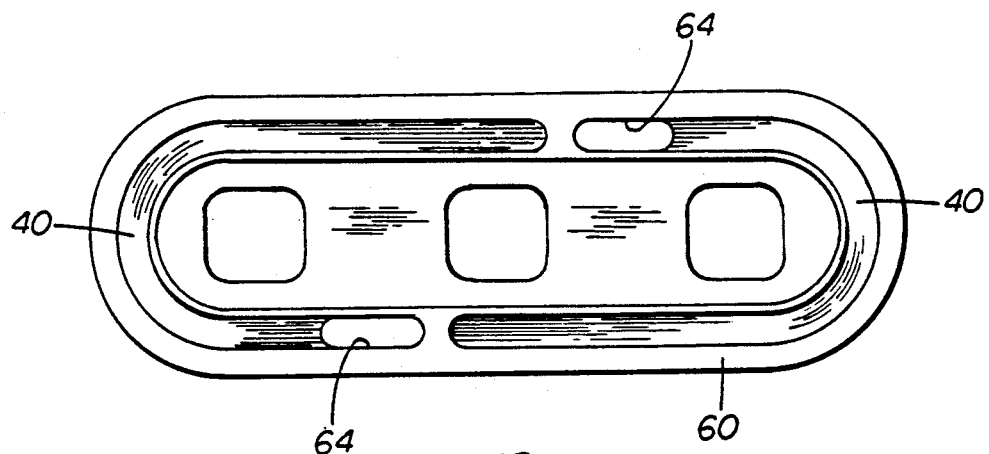
FIG. 2 is a top plan view of the lower plate of the partition of the hydraulic mount assembly shown in FIG. 1.

The partition 38 is formed of die cast metal (as shown) or may be plastic; and includes a pair of plates 58, 60 with matching peripheries. These plates 58, 60 span the cavity and cooperate to define the two extended damping orifice tracks 40 interconnecting the chambers 54, 56. One opening (not shown) is provided at one end of each of the orifice tracks 40 in the plate 58 through which the tracks communicate with the primary chamber 54. A similar opening 64 is provided in the lower plate 60 at the opposite end of each of the orifice tracks 40 for communication with the secondary chamber 56 (see FIG. 2). Of course, the orifice tracks 40 may also be formed to a selected length and/or width so as to provide the mount with desired damping properties. A single track 40 could also be provided if desired.

When a vibratory input is provided to the mount assembly 10, liquid flows through and around the orifice tracks 40. The resulting fluid exchange between the primary and secondary chambers 54, 56 produces the passively tuned damping effect due to the designed resonance of the column of liquid in the tracks 40. The increased resistance to flow along the orifice tracks 40 and the inertial effects of the liquid column provides this proven tuning action.

In operation for full damping action, and assuming first a compressive force from vibratory action being impressed across mounting members 12, 14, there is a contraction of the primary chamber 54. As this occurs, the liquid therein is forced to flow through the orifice tracks 40 into the secondary chamber 56. The secondary chamber 56 then expands as permitted by the elasticity of the diaphragm 36. On reversal of vibratory force, that is release of the compressive force, the memory of the elastomeric body 20 and the diaphragm 36 causes the primary chamber 54 to expand and the stretched diaphragm 36 to retract. The contraction of the secondary chamber 56 forces the damping liquid back through the orifice tracks 40 into the primary chamber 54 to complete the damping cycle.

Each of the hydraulic damping decouplers 42, 44, 46 is a rectangular plate (in the preferred embodiment illustrated as a square). Other shapes could, however, be utilized. An elastomeric sealing and cushioning ring formed of natural or synthetic rubber may be molded to the decouplers 42, 44, 46 about the perimeter thereof. Each of the decouplers 42, 44, 46 is mounted for limited up and down reciprocal movement in a cavity 66 that is formed between the partition plates 58, 60. The respective upper and lower faces of the decouplers 42, 44, 46 are directly engaged by the damping liquid within the primary and secondary chambers 54, 56.

Advantageously, the decouplers 42, 44, 46 are provided so as to be centered relative to the dome areas 26, 28, 30 respectively. The dome areas 26, 28, 30 function as pumping surfaces that concentrate the dynamic fluid pressure and focus that pressure generally in a column over the decouplers 42, 44, 46 respectively. Because of this unique placement, the decouplers 42, 44, 46 respond rapidly to dynamic pressure fluctuations in the fluid. The pressure columns in the fluid are generally in alignment with the component mounting studs 16, 18 and symmetrical with respect to the center of the mount assembly 10.

The decouplers 42, 44, 46 act as a passive tuning component that effectively eliminates hydraulic damping below a prescribed low amplitude of engine vibration generated during vehicle operation and propagated by the studs 16. Specifically, the decouplers 42, 44, 46 provide reciprocating movement in response to alternating pressure buildups in the chambers 54, 56 acting on opposite faces of the decouplers. The reciprocating movement of the decouplers 42, 44, 46 within the plates 58, 60 toward and away from the chambers 54, 56 produces a limited volume change in the chambers that effects hydraulic decoupling.

Advantageously, the provision of multiple decouplers, and in this case three decouplers 42, 44, 46, provide unexpected benefits above and beyond those provided with a hydraulic mount assembly incorporating single, or even dual decouplers. The triple decouplers 42, 44, 46 illustrated reciprocate in the plates 58, 60 independently, and accordingly, are able to move out of phase with one another depending on differential pressures along the length of the mount assembly 10. Thus, it is able to respond more efficiently to localized pressure variations in the fluid along the length. Advantageously, the rapid, localized response serves to quickly reduce the pressure especially in the concentrated fluid columns that would otherwise build up under the dome areas 26, 28, 30. Because the dome 30 is projecting (rather than recessed) and centered, the column of fluid above the center decoupler 46 is confined less than the columns centered with respect to the recessed domes 26, 28. Accordingly, this center decoupler tends to lag in time, as well as force propagation. As a consequence, the dynamic stiffness of the hydraulic mount assembly 10 is reduced, especially at high frequencies up to 500 Hertz, and at small amplitudes.

The noise and vibration associated with displacements is significantly reduced. Further, chortle (i.e. the noise caused by a decoupler hitting the orifice plates as it is deflected by fluid) is also significantly reduced over other decoupler means. This is because the actuating pressure on each individual decoupler 42, 44, 46 is significantly lower than present in prior art single or double decoupler designs. Less decoupler mass is moved and seated at any one time. The composite force with which the decouplers hit the plate 58, 60 is thus reduced. In other words, as the decouplers 42, 44, 46 are moving out of phase, usually only one decoupler at a time is hitting the plates 58, 60.

It should also be appreciated that the lower dynamic rate provided for small amplitude displacements, especially at the higher frequencies is provided while also maintaining the required high damping rate necessary to control the motion of an engine during large amplitude displacements (such as are experienced during heavy acceleration, heavy deceleration and/or hard cornering). This combination of desirable characteristics is beneficially obtained through a passive system thereby eliminating the expense of active systems developed in the past to provide such operating characteristics.

FIG. 3 plots the dynamic rate of the mount assembly 10 of the present invention at various frequencies for a relatively low (±0.05 mm) amplitude displacement. The graph provides a direct comparison with a single decoupler mount assembly of prior art design and a dual decoupler mount assembly as disclosed and described in copending patent application Ser. No. 07/600,899 filed Oct. 22, 1990, and entitled "Hydraulic Mount with Dual Decouplers" assigned to the Assignee of the present invention.

As should be appreciated from reviewing the graph, the mount assembly 10 provides a relatively lower dynamic rate for a 0.05 mm amplitude displacement at frequencies substantially throughout the entire range from 250 to 500 Hz. For example at a frequency of 250 Hertz single and dual decoupler hydraulic mount designs become stiff. The dynamic rate is several times higher, over the main portion of the operating range for the same amplitude displacement. Accordingly, it should be appreciated that the present mount assembly 10 provides significantly improved vibration isolation characteristics. As a result, for example, improved isolation of vibration and substantial elimination of steering wheel and gear selector shake, as well as floor pan vibration, is provided. Overall ride performance is improved.

In accordance with a further aspect of the present invention, it should be appreciated that the mount assembly 10 of the present invention also provides a characteristic dip in dynamic rate, which can be translated into a reduction in functional stiffness. This is shown in FIG. 3 as occurring between approximately 260 and 375 Hz. Within the frequency range of this dip in stiffness, the mount assembly 10 is particularly effective in isolating vibrations and suppressing noise. Advantageously, the frequency range over which this dip in stiffness falls may be tuned to a particular frequency range. Accordingly, the mount assembly 10 may be designed to cancel resonances at problem frequencies characteristic of a particular component and frame arrangement with which the mount assembly is utilized. In this way improved ride performance is obtained to the satisfaction of the vehicle operator.

More particularly, the tuning of the dip in stiffness may be achieved by adjusting the relative surface area of each decoupler 42, 44, 46 positioned beneath the dome areas 26, 28, 30. Further, varying the total surface area of all the decouplers 42, 44, 46 combined is also relevant to tuning.

In summary, numerous benefits result from employing the concepts of the present invention. The hydraulic mount assembly 10 incorporates three decouplers 42, 44, 46. The decouplers 42, 44, 46 are centered relative to a dome areas 26, 28, 30 in the primary chamber. Such a structure is particularly responsive to localized dynamic pressure increases focused in the spaced columns of fluid between the pumping surfaces of the dome areas and the decouplers. Since the decouplers provide more efficient decoupling action, deleterious buildups of pressure and resulting stiffness at low amplitudes is avoided. Further, a dip in stiffness is characteristically achieved at relatively high frequencies. The range of frequencies over which this dip falls as well as the depth and breadth of the dip provided may be tuned by varying the surface area of the decouplers.

Advantageously, the design not only serves to significantly lower the small amplitude dynamic rate, particularly at higher frequencies but also maintains the desired damping characteristics for large displacements to provide the necessary control for the smoothest possible operation of the vehicle. Further, by providing these seemingly conflicting operating characteristics in a passive system, the present invention represents a significant advance in the art, as these operating characteristics were previously only obtainable with more expensive alternatives, such as active systems.

The foregoing description of a preferred embodiment of the invention has been presented for purposes of illustration or description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

We claim:

1. A hydraulic mount assembly providing variable damping characteristics, comprising:
   a pair of mounting members;
   a hollow body connected to said mounting members and defining at least three dome areas, spaced along the longitudinal axis of said hollow body;
   a resilient diaphragm closing said hollow body and forming therewith a closed cavity that is filled with liquid;
   means for partitioning said cavity into a primary chamber including said dome areas and a secondary chamber enclosed by said diaphragm;
   at least three decouplers on said partitioning means, each decoupler being generally aligned with one of said dome areas; and
   an orifice track in said partitioning means for connecting said chambers so as to effect damping;
   said dome areas serving to concentrate dynamic fluid pressure in said primary chamber and focus that pressure generally in a column over said decouplers for rapid response to localized pressure variations whereby a low dynamic rate for relatively small displacements is provided at relatively high frequencies while maintaining damping for large displacements.

2. A hydraulic mount assembly providing variable damping characteristics, comprising:
   a pair of mounting members;
   a hollow body connected to said mounting members and defining three substantially equally spaced dome areas, one dome area being centrally disposed on said hollow body;
   a resilient diaphragm closing said hollow body and forming therewith a closed cavity that is filled with liquid;
   means for partitioning said cavity into a primary chamber including said dome areas and a secondary chamber enclosed by said diaphragm;
   said central dome area projecting into the primary chamber and the other two dome areas being recessed;
   three decouplers on said partitioning means, one decoupler being substantially centered relative to each dome area in said primary chamber of the hollow body; and
   a pair of orifice tracks in said partitioning means for connecting said chambers so as to effect damping;
   said dome areas serving to concentrate dynamic fluid pressure in said primary chamber and focus that pressure generally in a column over said decouplers for rapid response to localized pressure variations whereby a low dynamic rate for relatively small displacements is provided at relatively high frequencies while maintaining damping for large displacements and a tunable distinctive dip in dynamic rate is provided at selected high frequencies.

* * * * *